July 25, 1967
P. E. RENOUX
3,332,305
THREAD-CUTTING MACHINE
Filed April 19, 1965
5 Sheets-Sheet 1
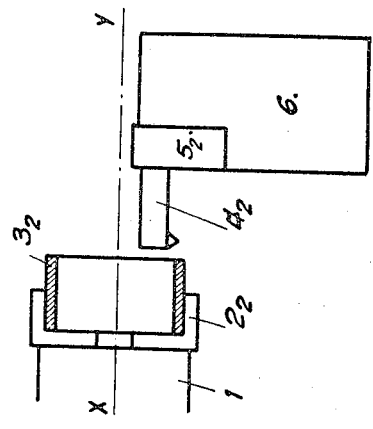
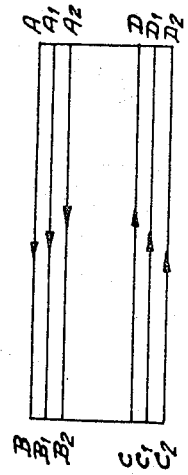
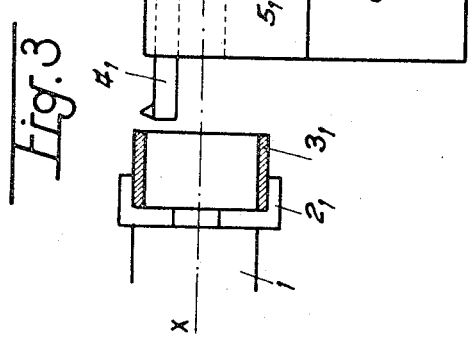
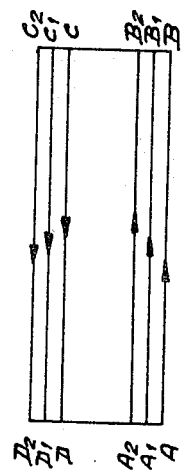
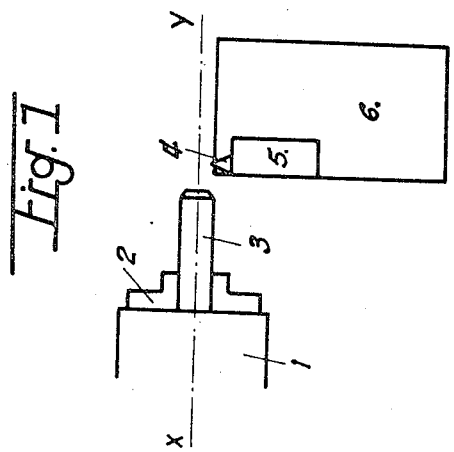

July 25, 1967 P. E. RENOUX 3,332,305
THREAD-CUTTING MACHINE
Filed April 19, 1965 5 Sheets-Sheet 2

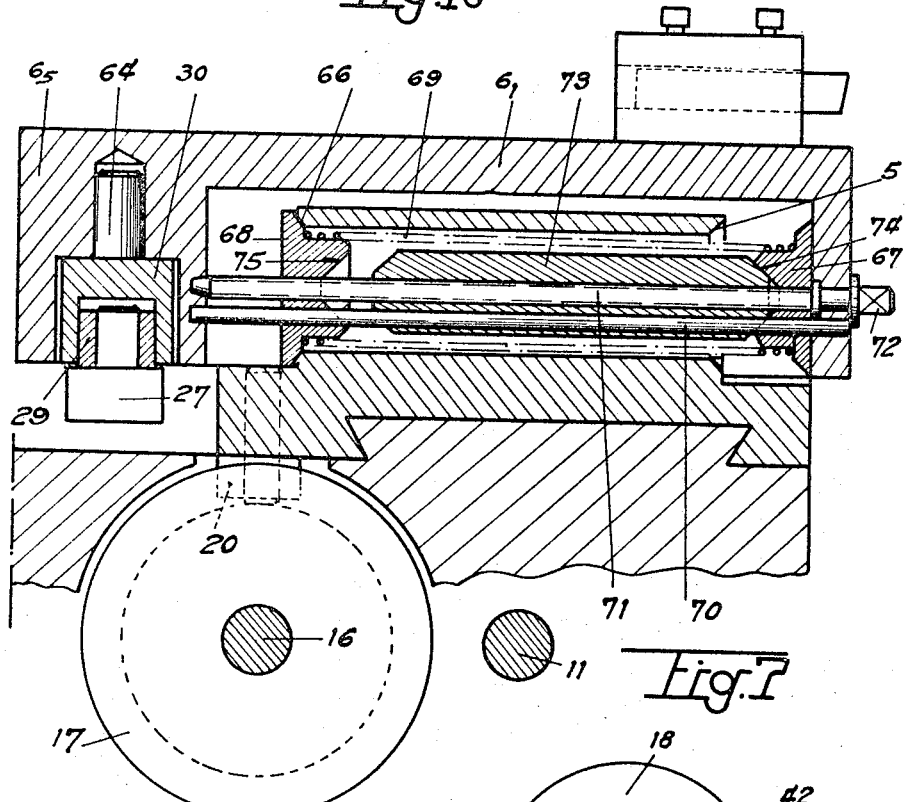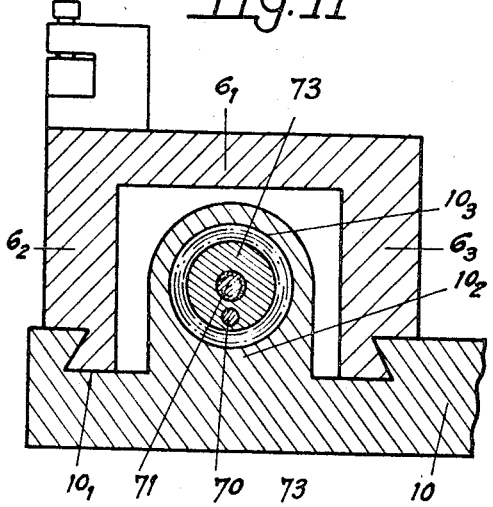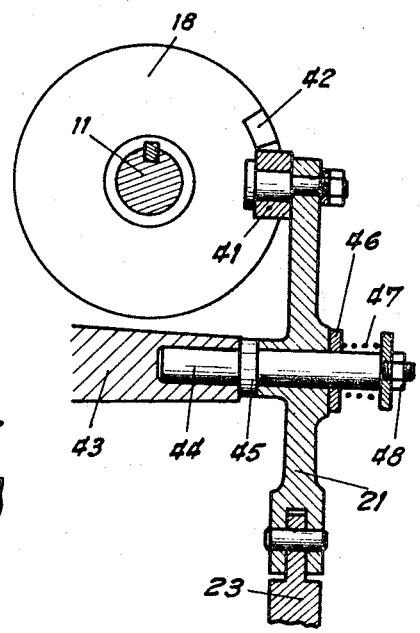

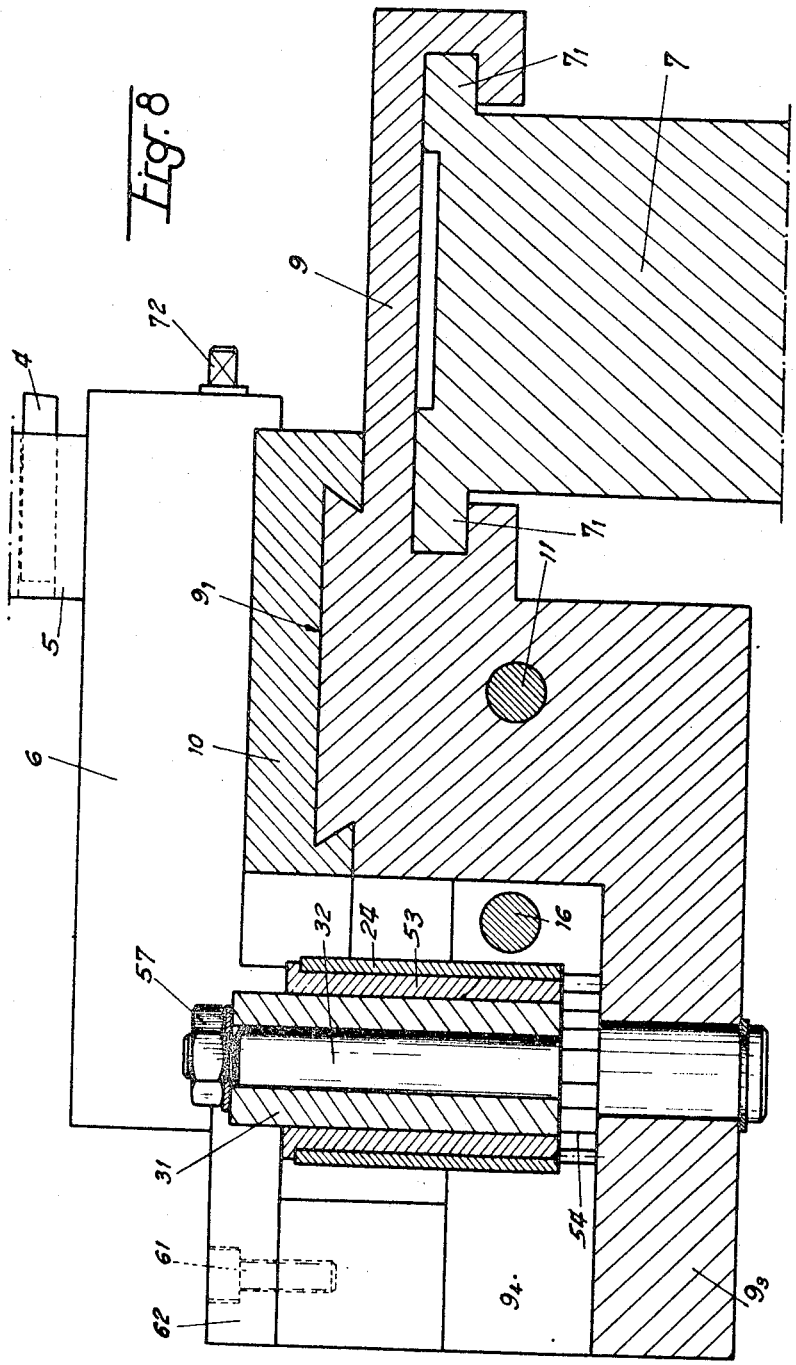

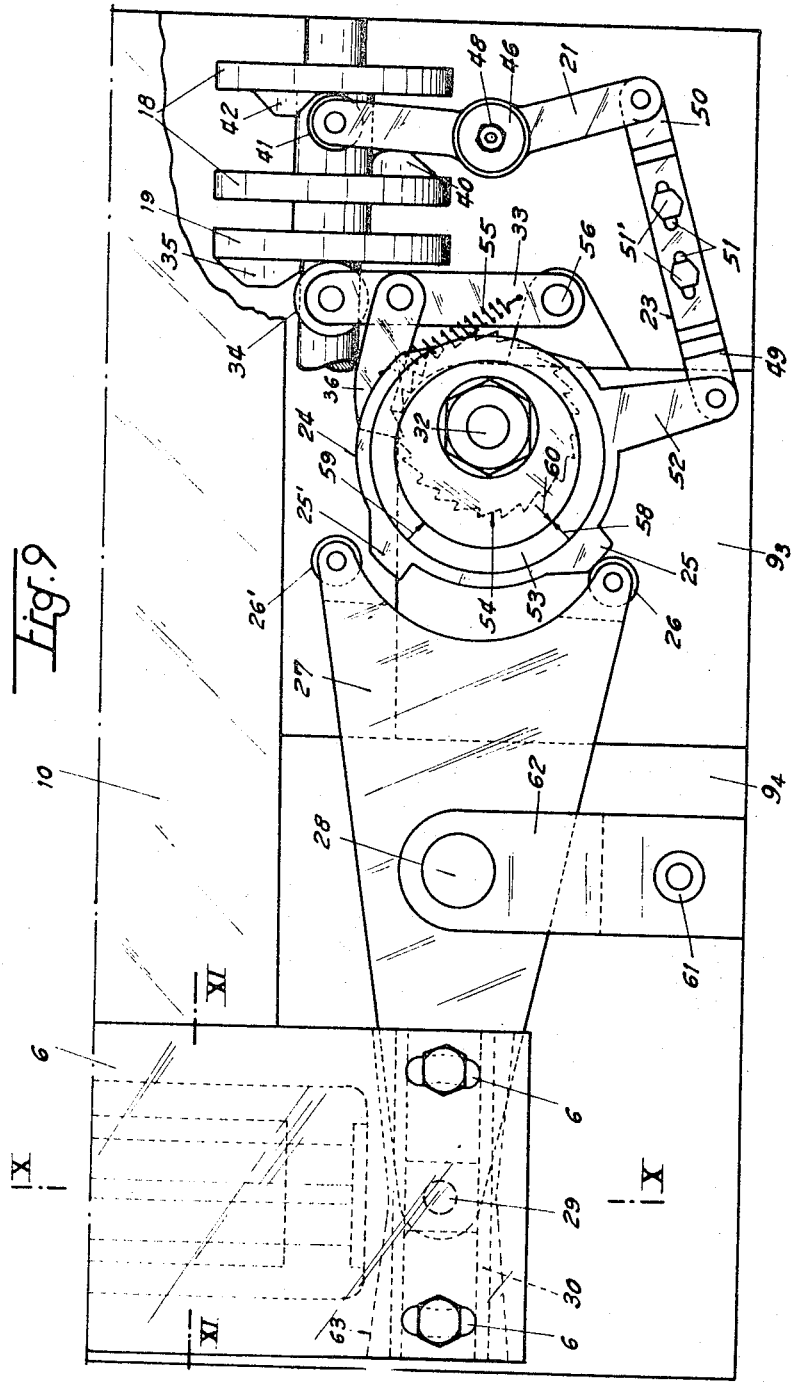

United States Patent Office 3,332,305
Patented July 25, 1967

3,332,305
THREAD-CUTTING MACHINE
Pierre Edouard Renoux, Colombes, France, assignor to Cri-Dan, Paris, France, a corporation of France
Filed Apr. 19, 1965, Ser. No. 449,175
Claims priority, application France, June 24, 1964, 979,452, Patent 1,407,778
4 Claims. (Cl. 82—5)

The present invention relates to an improved thread-cutting machine of the type comprising on a suitable frame at least one work-holding means, one tool-holder conveyed by a transverse carriage and a lengthwise carriage, a kinematic chain for producing the movement of rotation of the work-holder, the cutting and return motion of the lengthwise carriage, the down-feed and disengagement motion on the one hand and intermittent feed motion on the other hand of the transverse carriage.

It is known that in machines of this type, the tool must describe a series of work cycles which theoretically have the configuration of a rectangle or trapezium, wherein the long side of said rectangle or trapezium corresponds to the displacement of the tool during the working travel and during the return travel and the short sides correspond to the down-feed motion of the tool in the working position and to its disengagement for the return motion.

An intermittent feed motion is superimposed on the above-mentioned cyclic motion during the return travel, thereby producing the progressive penetration of the tool to the desired depth of thread.

As a rule, machines of the type referred to permit the cutting of external threads and internal threads whether cylindrical or conical, and the wide range of applications which is thus made possible constitutes a substantial advantage for the user.

However, it has been found from experience that one of the limitations either in the capacity or output of these machines lies in the fact that, when it is necessary to cut an internal thread of large diameter, the position of the tool and the direction of the cutting effort are diametrically opposite with respect to the axis of the machine to those which correspond to an external thread having the same diameter. This results in conditions which are unfavorable to the rigidity of the tool and imposes restrictive conditions in the design of the machine, especially when it is required to perform operations other than that of thread-cutting on the same machine.

The aim of this invention is to overcome the above-noted disadvantages and, with this object in view, a machine in accordance with the invention is essentially characterized in that the portion of the kinematic chain which produces the transverse movements of the cross-slide or transverse carriage comprises means for reversing the direction in which the control of the said movements is effected.

By virtue of this arrangement, the machine is capable of imparting to the tool symmetrical motion cycles which can be initiated at will depending on whether it is desired to form an external thread or an internal thread. The result achieved by this option is that the position of the threading tool with respect to the members which support said tool is approximately the same in both cases, that the direction of the cutting effort is also unchanged as well as the zone in which the tool works. It is therefore possible to arrange and dimension an improved thread-cutting machine in accordance with the invention with much greater freedom and, in particular, to place with ease other carriages for the purpose of performing other operations such as trueing of faces, cutting of grooves and chamfers and turning of bearing surfaces, thereby considerably increasing the output of the machine and its fields of application.

It is in order to achieve these different objects that the machine in accordance with this invention is essentially characterized in that the portion of the kinematic chain which produces the transverse movements of the transverse carriage comprises means for reversing the direction in which the control of said movements is carried out.

In accordance with a preferred form of embodiment of the invention, that portion of the kinematic chain which produces the down-feed motion and disengagement motion of the transverse carriage consists of a cam with two upward slopes to which is imparted an oscillating motion from a triple lever in which the two driving arms of said lever are each capable of following one of the upward slopes of said cam whilst the other arm is located at a distance from the second upward slope and the third arm of said lever controls the transverse carriage, and finally of means for returning the transverse carriage elastically either inwardly or outwardly of the machine.

As a preferred arrangement, the double-slope cam is mounted on the eccentric which imparts the intermittent feed motion to the transverse carriage and means are provided for placing the eccentric in its initial position opposite to either one or the other of said cam slopes.

Advantageously, the means for returning the transverse carriage elastically either inwardly or outwardly of the machine consist of a tension spring fitted with end clamps which are thrust back by an internal nut either in one direction or in the other so that one end clamp is accordingly wedged against the transverse carriage whilst the other end clamp is applied against a boss of the lengthwise carriage or conversely.

Finally, the third arm of the triple lever is capable of producing the movement of the transverse carriage by virtue of a shoe which cooperates with a channel, the angular setting of which with respect to the transverse carriage can be modified.

It will be apparent that, by virtue of these arrangements, it is merely necessary in order to switch from a cycle which permits of external thread-cutting to a cycle which permits of internal thread-cutting to reverse the means for elastic return of the transverse carriage, to place the eccentric opposite the desired upward slope of the double-slope cam and finally if so required to set the channel of the transverse carriage according to the conicity of the thread to be cut.

The same tool-holder can then be fitted with the tool which is adapted either to external thread-cutting or internal thread-cutting; moreover, the direction of the cutting effort during either of these operations remains unchanged and in the same zone of the machine.

A clear understanding of the invention will in any case be gained from the following description, reference being made therein to the accompanying drawings which show by way of non-limitative example one form of embodiment of the invention, and in which:

FIG. 1 illustrates diagrammatically the operating conditions in the case of a conventional external thread-cutting operation;

FIG. 2 shows the diagrammatic cycle of the tool in such a case;

FIG. 3 illustrates the operating conditions in a conventional internal thread-cutting operation;

FIG. 4 illustrates the operating conditions for the cutting of an internal thread in accordance with the invention;

FIG. 5 shows the cycle of the tool in such a case;

FIGS. 7 and 8 represent transverse sectional views on a larger scale, these views being taken respectively along the lines VII—VII and VIII—VIII of FIG. 6;

FIG. 9 is an overhead view of the main components of the kinematic chain in accordance with the invention, and FIGS. 10 and 11 are longitudinal and transverse cross-sections of the transverse carriage taken respectively along the lines X—X and XI—XI of FIG. 9.

Figure 6:
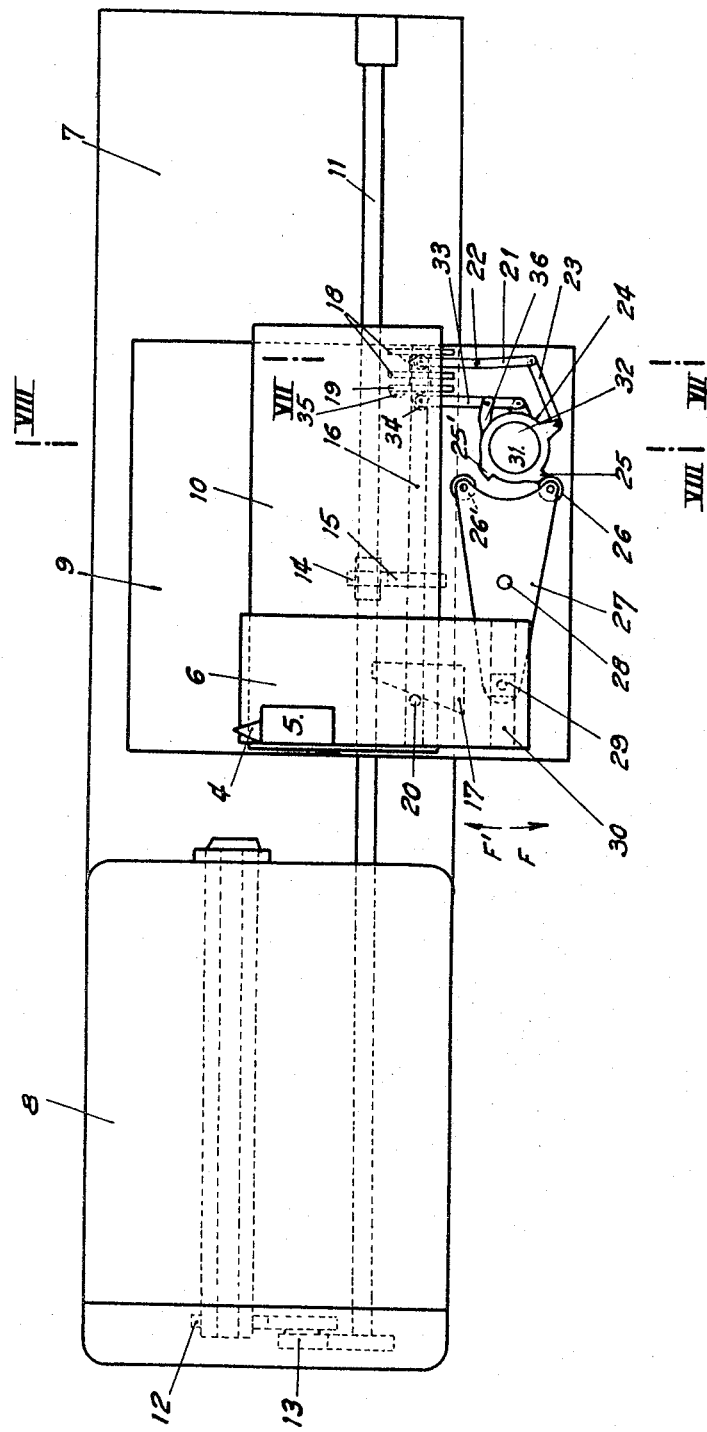
FIG. 6 is an overhead view on a small scale of a machine according to the invention.

In order to illustrate the explanations given hereinabove, there is shown in FIG. 1 the spindle 1 of a machine tool, the chuck 2 of which clamps a workpiece 3 to be threaded externally.

The external thread is formed by means of a tool 4 carried by a tool-holder 5 which is in turn mounted on a transverse carriage 6.

It is known that the cycle of the tool 4 for cutting an external thread in the workpiece 3 is in principle and very diagrammatically the cycle shown in FIG. 2. In fact, the tool follows a path A, B, C, D, $A_1$, $B_1$, $C_1$, $D_1$, $A_2$, $B_2$, $C_2$, $D_2$, etc., by virtue, for example, of a master cam, a double-slope cam and a feed-cam. The first cam initiates the longitudinal return and cutting movements of the lengthwise carriage (A, B; $A_1$, $B_1$; $A_2$, $B_2$; etc. and C, D; $C_1$, $D_1$; $C_2$, $D_2$; etc.). The second cam initiates the transverse down-feed and disengagement movements of the transverse carriage (B, C; $B_1$, $C_1$; $B_2$, $C_2$; etc. and D, A; $D_1$, $A_1$; $D_2$, $A_2$; etc.) which are the down-feed and disengagement paths of the tool. And the third cam initiates the intermittent feed motion of the transverse carriage which makes it possible to change over, for example, from the path A, B, C, D, to the path $A_1$, $B_1$, $C_1$, $D_1$.

However, in machines of known types, this cycle cannot be reversed, with the result that, if it is desired to cut an internal thread with the same machine, it is found necessary to adopt the position shown in FIG. 3.

Accordingly, the chuck $2_1$ clamps a tubular workpiece $3_1$ to be machined and the tool $4_1$ which is placed at the end of the tool-holder $5_1$ mounted on the same transverse carriage 6 works on the other side of the axis Y—Y of the machine.

However, the disadvantages of this mode of assembly have already been pointed out.

For this reason, provision has been made in accordance with the invention for means whereby the tool $4_2$ is mounted in the manner shown in FIG. 4 on the tool-holder $5_2$ which is still carried by the transverse carriage 6. It can be visualized that, in this embodiment, the workpiece $3_2$ which is carried by the chuck $2_2$ is machined in a zone which is close to the active zone of the tool 4 of FIG. 1.

However, in order to obtain this result, it has been found necessary to adopt the cycle shown in FIG. 5, in which the same letters have been employed as in FIG. 2 for the purpose of designating the same movements.

A comparison of FIGS. 2 and 5 shows that, whereas the master cam works in identical manner in both cases, the operation of the double-slope cam and feed-cam is reversed.

The precise object of the invention having thus been defined, one form of embodiment thereof will now be described in detail first of all in reference to the overhead view on a small scale of FIG. 6.

There is shown in this overhead view a machine tool wherein the bed 7 carries the headstock 8 and the slide 9 surmounted by the lengthwise carriage 10 on which the transverse carriage 6 referred-to above is adapted to move. The spindle 1 which is driven by a motor (not shown) drives a main shaft 11 carried by the bed 7 by means of a gear system 12 and an adjusting-plate 13.

The shaft 11 is splined so as to drive a pinion 14 which is slidable along said shaft 11 in order that a pinion 15 keyed on the slide shaft 16 may be driven in any position of the slide.

The shaft 16 is in turn fitted with the master cam 17, the double-slope cam 18 and the feed-cam 19.

The first cam 17 is adapted to cooperate with a roller 20 which is integral with the lengthwise carriage and it will be apparent that, by producing action in opposition to an elastic means which has not been illustrated, said cam effectively produces the longitudinal movements A, B, C, D, and so forth which are shown on a larger scale in FIGS. 2 and 5.

The double-slope cam initiates the rocking motion of a lever 21 which is pivotally mounted at 22 on the slide and which, by virtue of the arm 23, produces a reciprocating movement of rotation of the cam 24. Said cam, which is of generally circular shape, is provided with two bosses 25 and 25' which each form an upwardly sloping portion between two concentric zones, the boss 25 being designed to cooperate with a roller 26 carried by a triple lever 27, said lever being pivotally mounted on the pin 28 which is integral with the slide.

Said triple lever is fitted with a shoe 29 which is adapted to slide between the faces of a channel 30 formed on the underside of the transverse carriage 6.

By virtue of a means which has not been shown in the drawings, the transverse carriage 6 is thrust back elastically in the direction of the arrow F, with the result that the roller 26 is applied against the boss 25 of the cam 24.

It will be understood that the rocking movements of the lever 21 which are transmitted by the arm 22 are transformed by means of the boss 25 into rocking movements of the triple lever 27 which in turn produces the movements of the transverse carriage 6 which correspond to the movements B, C, etc., or D, A, etc., of the cycle in accordance with FIG. 2. It will be noted in addition that the boss 25 produces positive action in the case of the down-feed motion of the tool (B, C; $B_1$, $C_1$; etc.).

It will now be assumed that, instead of exerting elastic action on the transverse carriage 6 in the direction of the arrow F, this action is exerted in the direction of the arrow F'.

It will readily be understood that the triple lever 27 swings over and that the roller 26 moves away from the boss 25. On the other hand, the opposite roller 26' of the triple lever is applied against the boss 25' which is identical with the boss 25 but angularly displaced through a suitable angle with the precise object of ensuring that said boss 25' cooperates with the roller 26' when the triple lever 27 swings over.

The result thereby achieved is that, this time, the rocking movements of the lever 21 automatically produce a cycle which is the reverse of the preceding, namely the cycle in accordance with FIG. 5; the boss 25' produces positive action in opposition to the action F' so as to displace the transverse carriage 6 in the direction of the down-feed motion of the cycle in accordance with FIG. 5 (B, C; $B_1$, $C_1$; etc.).

By virtue of the kinematic chain which extends from the double-slope cam 18 to the transverse carriage 6 by way of the lever 21, the arm 23, the double-boss cam 24, the triple lever 27 and the shoe 29, a means has thus been effectively provided for the purpose of changing over by simple reversal of the elastic action exerted on the carriage 6 from the cycle of FIG. 2 to the cycle of FIG. 5.

It is therefore possible, when changing over from an external thread-cutting operation in accordance with FIG. 1 to an internal thread-cutting operation in accordance with FIG. 4, to replace the tool 4 by a tool $4_2$ and always to work in the same zone of the machine.

It will be noted by those who are versed in the art that no reference has been made in the foregoing description to the third movement which is imparted to the tool, namely the movement which produces the successive forward movements of the tool at each cutting stroke starting from the feed-cam 19.

In point of fact, this third movement could be imparted to the transverse carriage by any known means or produced independently of the preceding.

However, the present applicant has considered it easier and more advantageous to superimpose the control of the aforesaid movements by causing the cam 24 to perform a pivotal movement not on a stationary axis but on an axis consisting of an eccentric which is driven in step-by-step motion from the cam 19.

It will in fact be observed from a study of FIG. 6 that the cam 24 is mounted on the eccentric 31 which is pivotally mounted at 32 and that a lever 33 which is fixed to the slide is capable of carrying out a rocking movement by virtue of its roller 34 which is controlled by the boss 35 of the feed-cam and actuates by virtue of a pawl 36 a ratchet-wheel, not shown in the drawings, which is integral with the eccentric 31 and disposed beneath this latter.

A substantial advantage is thus gained in that the reversal of the elastic action from F to F' also reverses the direction in which the eccentric 31 produces action and therefore automatically produces the desired result, which consists in displacing the successive paths outwardly as shown in FIG. 5 and not inwardly as shown in FIG. 2.

In fact, in both cases, the eccentric 31 operates in the same manner; for example, the progressive increase in its useful length results in a displacement of the transverse carriage, the first time inwardly and the second time outwardly.

The only precaution to be taken consists in placing the origin of the eccentric by hand in an identical position in both cases with respect to the operative boss 25 or 25'. The manner in which this operation can readily be performed with the aid of simple reference marks will be explained hereunder.

The detail views on a larger scale which will now be described are intended to show the precise manner in which the invention has been carried into practice by the present applicant. Accordingly, reference will first of all be made to FIGS. 7, 8 and 9, wherein FIG. 7 is a cross-section taken along the line VII—VII of FIG. 6, FIG. 8 is a cross-section taken along the line VIII—VIII of FIG. 6 and FIG. 9 is a partial overhead view of the main mechanisms.

It will first of all be noted that these figures, especially FIG. 8, serve to illustrate the general design of the machine, wherein the bed 7 is provided with guides $7_1$ for the slide 9 which consists of an upper platform and slideway $9_1$ for the lengthwise carriage 6 and a lower platform forming three successive bearing-plates $9_2$, $9_3$ and $9_4$ of increasing thickness.

It will then be noted that the cam 18 is designed in the form of two oppositely facing plates each provided with an internal boss. The boss 40 displaces the roller 41 of the lever 21 towards the right-hand side of the figure and the boss 42 towards the left-hand side.

This arrangement, which offers a number of advantages from a technical viewpoint, particularly insofar as it permits of displacement of the bosses with respect to each other for the purpose of regulating the pivotal movements of the lever 21, makes it necessary to employ a braking system for the lever 21 as illustrated in FIG. 7. Accordingly, there is shown in this figure a column 43 forming part of the slide and carrying a shaft 44 on which are fitted a bearing washer 45 followed by the lever 21, then two washers 46 separated by a spring 47, the end washer being held in position by means of a bolt 48.

It will also be noted that, in order to permit of adjustments, the arm 23 is composed of two independent members 49 and 50 which are capable of sliding lengthwise relatively to each other by virtue of elongated slots 51 and which are rigidly secured to each other by means of two bolts 51'.

The arm 23 is adapted to cooperate with the appendage 52 of the double-boss cam 24 which is fitted over a cylindrical sleeve 53. The sleeve 53 is in turn fitted over the eccentric 31, the shaft 32 of which is carried by the bearing-plate $9_3$ of the slide and is fitted with the ratchet-wheel 54 which engages with the pawl 36, said pawl being acted upon by the spring 55.

It will be recalled that the pawl 36 is actuated by virtue of the roller 34 which cooperates with the boss 35 of the feed-cam 19 and which initiates the pivotal motion of the lever 33, the pin 56 of which is mounted on the bearing-plate $9_2$ of the slide.

A bolt 57 which cooperates with the threaded end of the shaft 32 serves to key the eccentric 31 in the desired position either opposite to the boss 25 or the boss 25', this operation being facilitated by two reference marks 58 and 59 which are cut on the sleeve 53 and by a reference mark 60 which is cut on the eccentric 31. In fact, it will already have become apparent from the foregoing description that it is merely necessary to place the reference mark 60 opposite to the reference mark 58 in order to perform the cycle according to FIG. 2 and to place the reference mark 60 opposite to the reference mark 59 in order to perform the cycle according to FIG. 5.

However, in this case also, it will be noted that the arrangement described has been simplified and that, in point of fact, the present applicant makes preferential use of a double eccentric of a type already known instead of the single eccentric 31, thus permitting the possibility of varying the depth of successive feeds of the tool at each cutting stroke depending, for example, on the strength of the metal being worked.

Proceeding now with the detailed description of the kinematic chain in accordance with the invention, it will be observed that the triple lever 27 is carried by the third bearing-plate $9_4$ of the bed which is provided for this purpose with a column on which is fixed at 61 an arm 62 which is adapted to cooperate with the bearing-plate $9_4$ itself so as to hold the lever pin 28.

FIGS. 10 and 11, which show longitudinal and transverse cross-sections taken along the lines X—X and XI—XI of FIG. 9 as well as the left-hand portion of this latter illustrate the constructional make-up of the transverse carriage and of the members which serve to exert elastic actions in the direction of the arrows F and F'.

It will first of all be noted that it is necessary to modify the angular setting of the channel 30 for the purpose of cutting conical threads.

With this object in view, the channel 30 is constituted by an inverted U-iron member which is placed within a recess 63 with divergent walls and formed in the underface of the transverse carriage. The channel is integral with a pivot-pin 64 which is mounted in the plane of symmetry of the carriage and with two locking-screws which traverse the carriage through bean-shaped slots 64'. The channel 30 can thus be set parallel to the axis of the machine for the cutting of cylindrical threads or in a more or less inclined position for the cutting of conical threads.

The transverse carriage consists of a platform $6_1$ and two lateral walls $6_2$ and $6_3$ which form a tunnel and the bottom portion thereof is cut in such a manner as to cooperate with slideways $10_1$ of the lengthwise carriage 10.

The tunnel is closed at one end by a longitudinal wall $6_4$ and at the other end by the block $6_5$ which accommodates the channel 30.

The lengthwise carriage 10 which carries, as has been noted hereinabove, the roller 20 to which movement is transmitted by the cam 17, is additionally provided with a boss $10_2$ which is pierced by a cylindrical bore $10_3$. The ends of said boss at the outlets of said bore $10_3$ form two bearing-surfaces 65 and 66 which are intended to cooperate with two end clamps 67 and 68 which are urged towards each other by a tension spring 69 which extends along the bore $10_3$.

The end clamps 67 and 68 are traversed by a first offset rod 70 along which said end clamps are capable of sliding and which serves to position these latter. There is also passed through said end clamps a centered screw 71 which is provided at the outer extremity with an operating square-head 72. The rod 70 and the screw 71 are keyed to the wall $6_4$ and in the block $6_5$ and thus secured against translational motion. Said rod and said screw also pass through a nut 73 which engages with the thread of the screw 71 and which terminates in two conical bearing surfaces which are adapted to cooperate with corresponding bearing surfaces 74 and 75 of the two end clamps 67 and 68.

The object of the device which has just been described is to produce elastic action on the transverse carriage either in the direction of the arrow F or in the direction of the arrow F' (as shown in FIG. 6).

In fact, if it is assumed that the screw 71 has been operated at 72 so as to thrust back the nut 73 until this latter moves the end clamp 67 away from the bearing surface 65 and locks said end clamp against the wall $6_4$, it can be visualized that, as a result, the end clamp 68 is brought to bear at 66, that is to say on the lengthwise carriage; as shown in FIG. 10, the tension spring therefore pulls the end clamp 67 towards the left, thus securing this latter to the transverse carriage between the nut 73 and the wall $6_4$.

The machine is therefore in the position corresponding to an elastic action in the direction of the arrow F.

Now if, on the contrary, the square head 72 of the screw 71 is operated so as to move the nut 73 towards the left, the end clamp 68 will accordingly be secured between the block $6_5$ and the nut 73. This assembly which is integral with the transverse carriage will then be drawn by the tension spring towards the end clamp 67 which comes into abutment with the bearing surface 65, that is to say in the direction of the arrow F'.

Finally, it is observed that the operation entailing a reversal of the direction in which the elastic force is applied consists solely in screwing or unscrewing the screw 71 by means of the square-head 72.

As will be recalled, there automatically takes place a positioning of the triple lever in such a manner that this latter cooperates either with the boss 25 or with the boss 25'; the only other operations to be performed consist in the positioning of the eccentric 31 and if necessary the setting of the channel 30.

It will in any case be readily apparent that the form of embodiment of the invention which has just been described has only been given by way of non-limitative example and that a large number of modifications can be made therein without consequently departing either from the scope or the spirit of the invention.

What I claim is:

1. Thread-cutting machine of the type comprising on a suitable frame at least one work-holding means and one tool-holder conveyed by a transverse carriage and a lengthwise carriage, and a kinematic chain for producing the movement of rotation of the work-holder, the cutting and return motion of the lengthwise carriage, the down-feed and disengagement motion on the one hand and intermittent feed motion on the other hand of the transverse carriage, said machine being essentially characterized in that the portion of the kinematic chain which produces the transverse movements of the transverse carriage comprises means for reversing the direction in which the control of said movements is carried out.

2. Thread-cutting machine in accordance with claim 1, wherein the portion of the kinematic chain which produces the down-feed motion and disengagement motion of the transverse carriage consists of a cam with two upward slopes to which a rocking motion is imparted by a triple lever and the two driving arms of said lever are each capable of following one of the upward slopes of said cam whilst the other arm is located at a distance from the second upward slope and the third arm of said lever controls the transverse carriage, and finally of means for returning the transverse carriage elastically either inwardly or outwardly of the machine.

3. Thread-cutting machine in accordance with claim 2, wherein the double-slope cam is mounted on the eccentric which produces the intermittent feed-motion of the transverse carriage and means are provided for placing the eccentric in its initial position opposite to either one or the other of the cam slopes.

4. Machine in accordance with claim 2, wherein the means for returning the transverse carriage elastically either inwardly or outwardly of the machine consist of a tension spring fitted with end clamps which are thrust back by an internal nut either in one direction or in the other so that one end clamp is accordingly wedged against the transverse carriage whilst the other end clamp is applied against a boss of the lengthwise carriage or conversely.

No references cited.

HARRISON L. HINSON, *Primary Examiner.*